(12) United States Patent
Angamuthu Ganesan et al.

(10) Patent No.: US 12,482,079 B2
(45) Date of Patent: Nov. 25, 2025

(54) SYSTEM AND METHOD FOR REMOVING HAZINESS IN DIGITAL IMAGES

(71) Applicant: Caterpillar Inc., Peoria, IL (US)

(72) Inventors: Mahendra Kumar Angamuthu Ganesan, Chennai (IN); Prabu Palaniappan, Namakkal (IN); Arun Anandan, Chennai (IN); Swaran Thekkevavanoor, Chennai (IN); Abdul A. Mahaboob Basha, Chennai (IN)

(73) Assignee: Caterpillar Inc., Peoria, IL (US)

( * ) Notice: Subject to any disclaimer, the term of this patent is extended or adjusted under 35 U.S.C. 154(b) by 369 days.

(21) Appl. No.: 17/917,303

(22) PCT Filed: Mar. 31, 2021

(86) PCT No.: PCT/US2021/025091
§ 371 (c)(1),
(2) Date: Oct. 6, 2022

(87) PCT Pub. No.: WO2021/211297
PCT Pub. Date: Oct. 21, 2021

(65) Prior Publication Data
US 2023/0107829 A1 Apr. 6, 2023

(30) Foreign Application Priority Data
Apr. 17, 2020 (IN) .............................. 202011016605

(51) Int. Cl.
*G06T 5/80* (2024.01)
*G06T 3/40* (2024.01)
(Continued)

(52) U.S. Cl.
CPC .................. *G06T 5/80* (2024.01); *G06T 3/40* (2013.01); *G06T 5/20* (2013.01); *G06V 10/60* (2022.01);
(Continued)

(58) Field of Classification Search
CPC .... G06T 5/80; G06T 3/40; G06T 5/20; G06T 2207/20028; G06V 10/60; G06V 10/751
See application file for complete search history.

(56) References Cited

U.S. PATENT DOCUMENTS 8,396,324 B2  3/2013 Kang et al.
8,417,053 B2  4/2013 Chen et al.
(Continued)

FOREIGN PATENT DOCUMENTS

CN     104202577 A   12/2014
CN     104899844 A    9/2015
(Continued)

OTHER PUBLICATIONS

International Search Report related to Application No. PCT/US2021/025091; reported on Jul. 2, 2021.
(Continued)

*Primary Examiner* — Amir Alavi
*Assistant Examiner* — Matthew James Bodnark (57) ABSTRACT

A method for removing haziness in a digital image is provided. The method includes receiving an input digital image having some haze content from an image capturing device. The input digital image is downscaled to obtain a low-resolution image. Further, a minimum intensity dark channel is determined for each local patch of the low-resolution image to obtain a dark channel image corresponding to the low-resolution image. Furthermore, a transmission map of the low-resolution image is determined based on the dark channel image. Moreover, an atmospheric light value associated with the low-resolution image is also determined. The method further includes applying the determined transmission map and the atmospheric light value associated with the low-resolution image to the input digital image to
(Continued)

generate a de-hazed output image and displaying the generated de-hazed output image on a display unit.

20 Claims, 7 Drawing Sheets

(51) Int. Cl.
  *G06T 5/20* (2006.01)
  *G06V 10/60* (2022.01)
  *G06V 10/75* (2022.01)
(52) U.S. Cl.
  CPC .. *G06V 10/751* (2022.01); *G06T 2207/20028* (2013.01)

(56) References Cited

U.S. PATENT DOCUMENTS

| | | | |
|---|---|---|---|
| 9,197,789 B2 | 11/2015 | Mukhopadhyay et al. | |
| 10,049,607 B2* | 8/2018 | Veernapu et al. | G09G 3/20 |
| 2011/0188775 A1 | 8/2011 | Sun et al. | |
| 2016/0048742 A1* | 2/2016 | Huang et al. | G06K 9/62 |
| 2016/0071244 A1* | 3/2016 | Huang et al. | G06T 5/00 |
| 2019/0180423 A1* | 6/2019 | Lukac et al. | G06T 5/00 |

FOREIGN PATENT DOCUMENTS

| | | | |
|---|---|---|---|
| CN | 105374013 A | 3/2016 | |
| CN | 107292298 A * | 10/2017 | G06N 3/08 |
| KR | 101279374 B1 | 7/2013 | |
| KR | 101705536 B1 | 2/2017 | |

OTHER PUBLICATIONS

Indian Detailed Technical Report related to Application No. 202011016605; reported on Apr. 29, 2022.
Linting Bai, et al., "Real Time Image Haze Removal on Multi-core DSP", Procedia Engineering, vol. 99, 2015, pp. 244-252, XP029140007, ISSN: 1877-7058, DOI: 10/2016/J.PROENG.2014.12.532 abstract; figure 1 sections 4., 4.1-4.4.
Yutaro Iwamoto, et al, "Fast Dark Channel Prior Based Haze Removal from a Single Image", 2018 14th International Conference on Natural Computation, Fuzzy Systems and Knowledge Discovery (ICNC-FSKD), IEEE, Jul. 28, 2018, pp. 458-461, XP033537704, DOI: 10,1109/FSKD.2018.8686854 [retrieved on Apr. 10, 2019] sections I. and III., 3.1-3.3.
Kaiming He, et al., "Single Image Haze Removal Using Dark Channel Prior", IEEE Transctions on Pattern Analysis and Machine Intelligence, IEEE Computer Society, USA, vol. 33, No. 12, Dec. 1, 2011, pp. 2341-2353, XP011409121, ISSN: 0162-8828, DOI: 10.1109/TPAMI.2010.168 sections 3. and 4.

* cited by examiner

SYSTEM AND METHOD FOR REMOVING HAZINESS IN DIGITAL IMAGES

CROSS-REFERENCE TO RELATED APPLICATION

This Application is a 35 USC § 371 US National Stage filing of International Application No. PCT/US2021/025091 filed on Mar. 31, 2021 which claims priority under the Paris Convention to Indian Patent Application number 202011016605 filed on Apr. 17, 2020.

TECHNICAL FIELD

The present disclosure relates to image processing systems and methods. More particularly, the present disclosure relates to a system and method for removing haze in digital images and videos captured by image capturing device mounted on a mobile work machine.

BACKGROUND

Mobile work machines, such as on-highway or off-highway haul trucks, motor graders, excavators, snowplows, and other types of heavy equipment, are used for performing a variety of tasks. Some of these tasks involve carrying or pushing large and/or heavy loads along haul roads. To assist operators in guiding the work machines safely and efficiently along the haul roads, some work machines are equipped with image processing systems including cameras located on a front end of each work machine. The cameras capture videos/images of the environment ahead of the work machine, and the image processing system renders the images on an on-board display of the work machine to provide a clear view of the surrounding environment to the operator. However, during inclement weather conditions such as haze, fog, sandstorms, and so on, insufficient visibility causes such image processing systems to capture and display hazy videos/images having poor visibility of the surrounding environment to the operator, which negatively impacts the performance of the operator as well as the work machine.

To improve visibility in the hazy videos/images captured by such image processing system, several haze removal techniques have been proposed. However, the implementation of such haze removal techniques requires high end processing systems with high computational power. Further, such haze removal techniques require high processing times and hence act as barriers in real-time (or near real time) implementation of such haze removal techniques on the image processing systems.

Chinese Publication No. 104202577 relates to a car video sharpening system. The car video sharpening system includes an infrared camera for acquiring car front images and transmitting signals associated with the acquired images to a video processor through a video decoder. The video processor processes the signals based on RGB-HSI conversion and Retinex image enhancement algorithm, and transmits the enhanced image to a display unit in a cab, through a video encoder, which then displays the enhanced image to the car driver.

SUMMARY OF THE INVENTION

In an aspect of the present disclosure, a method for removing haziness in a digital image, is provided. The method includes receiving, by a processing unit, an input digital image from an image capturing device. The input digital image includes at least some haze content. Further, the method includes downscaling, by the processing unit, the input digital image to obtain a low-resolution image. Furthermore, the method includes determining, by the processing unit, a minimum intensity dark channel for each local patch of the low-resolution image to obtain a dark channel image corresponding to the low-resolution image. The method also includes determining, by the processing unit, a transmission map of the low-resolution image based on the determined dark channel image. Further, the method includes determining, by the processing unit, an atmospheric light value associated with the low-resolution image. Also, the method includes applying, by the processing unit, the determined transmission map and the atmospheric light value associated with the low-resolution image to the input digital image to generate a de-hazed output image. Furthermore, the method includes displaying, by the processing unit, the generated de-hazed output image on a display unit.

In another aspect, the present disclosure is directed to a system for removing haziness in a digital image. The system includes an image capturing device associated with a mobile work machine. Also, the system includes a display unit associated with the mobile work machine. The system includes a memory unit, and a processing unit communicatively coupled to the image capturing device, the display unit, and the memory unit. The processing unit is configured to receive an input digital image from the image capturing device. The input digital image includes at least some haze content. Also, the processing unit is configured to downscale the input digital image to obtain a low-resolution image; determine a minimum intensity dark channel for each local patch of the low-resolution image to obtain a dark channel image corresponding to the low-resolution image; determine a transmission map of the low-resolution image based on the determined dark channel image; determine an atmospheric light value associated with the low-resolution image; apply the determined transmission map and the atmospheric light value associated with the low-resolution image to the input digital image to generate a de-hazed output image; and display the generated de-hazed output image on the display unit.

In yet another aspect, the present disclosure is directed to a non-transitory computer readable medium having computer executable instructions stored thereon, which when executed by a processing unit perform a method of removing haziness in a digital image. The method includes receiving an input digital image from an image capturing device. The input digital image includes at least some haze content. Further, the method includes downscaling the input digital image to obtain a low-resolution image. Also, the method includes determining a minimum intensity dark channel for each local patch of the low-resolution image to obtain a dark channel image corresponding to the low-resolution image. The method also includes determining a transmission map of the low-resolution image based on the determined dark channel image. Further, the method includes determining an atmospheric light value associated with the low-resolution image. Also, the method includes applying the determined transmission map and the atmospheric light value associated with the low-resolution image to the input digital image to generate a de-hazed output image. Furthermore, the method includes displaying the generated de-hazed output image on a display unit.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
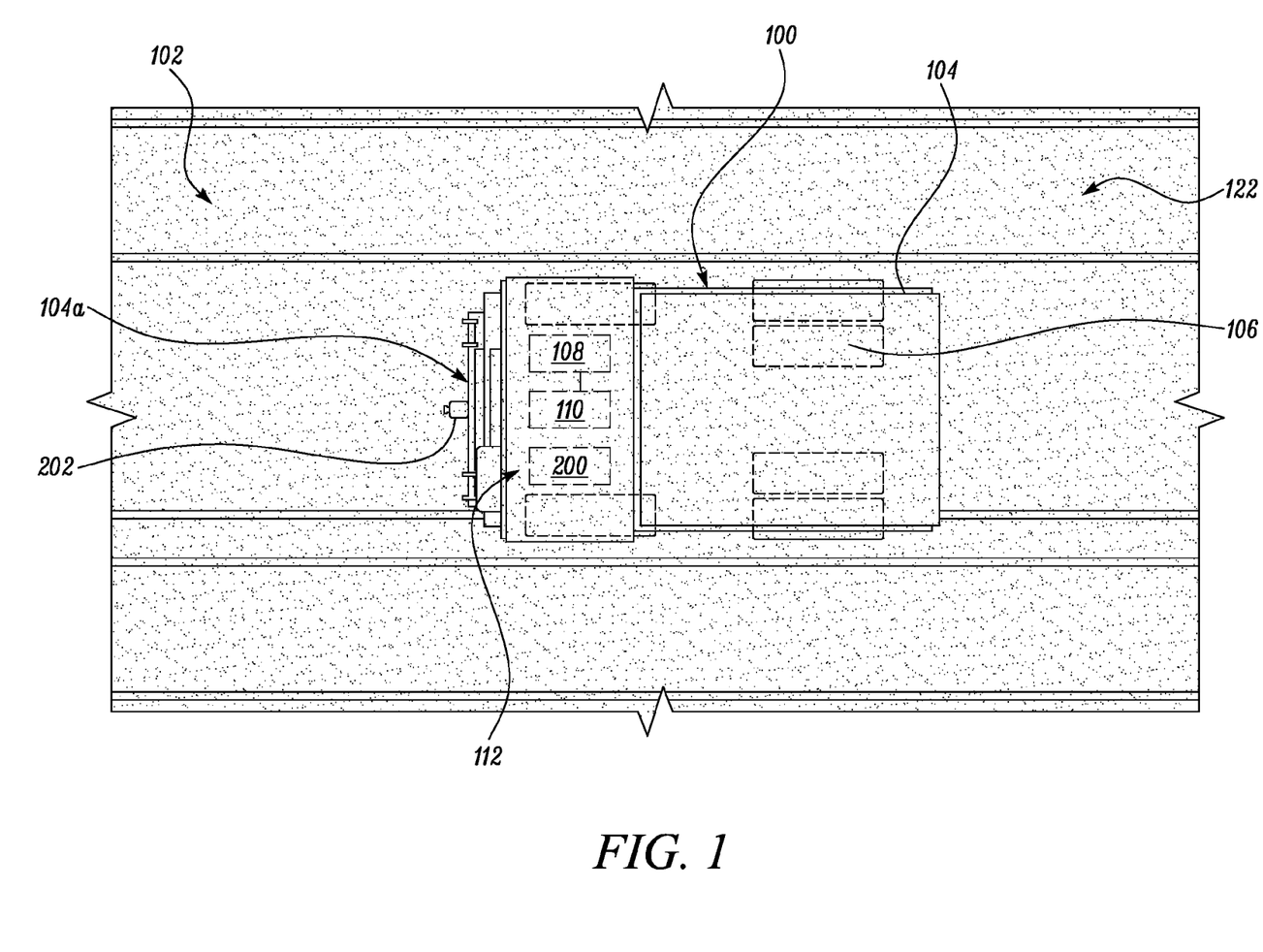
FIG. 1 is a top view of an exemplary work machine operating in a hazy environment, in accordance with an embodiment of the present disclosure.

FIG. 1 illustrates an exemplary mobile work machine 100 operating in a work environment 102, according to the embodiments of the present disclosure. The mobile work machine 100, hereinafter referred to as the machine 100, may embody a work vehicle that performs an operation associated with industry, such as mining, construction, farming, transportation, or any other industry known in the art. For example, the machine 100 may be an earth moving machine such as an off-highway haul truck, a service truck, a loader, a motor grader, or any other earth moving machine. The machine 100 may alternatively embody an on-highway vocational truck or passenger vehicle, or any other suitable operation-performing machine.

The machine 100 may include, among other things, a body 104, having a front end 104a, supported by one or more traction devices 106 and a propulsion system (not shown) for propelling the traction devices 106. The propulsion system may include a prime mover 108 and a power transmission 110 operatively connected to the prime mover 108. The prime mover 108 may include an engine, such as an internal combustion engine, configured to power operations of various systems on the machine 100, such as the traction devices 106. Optionally, the prime mover may also include an electrical power source, either alone or in combination with the engine.

Figure 2:
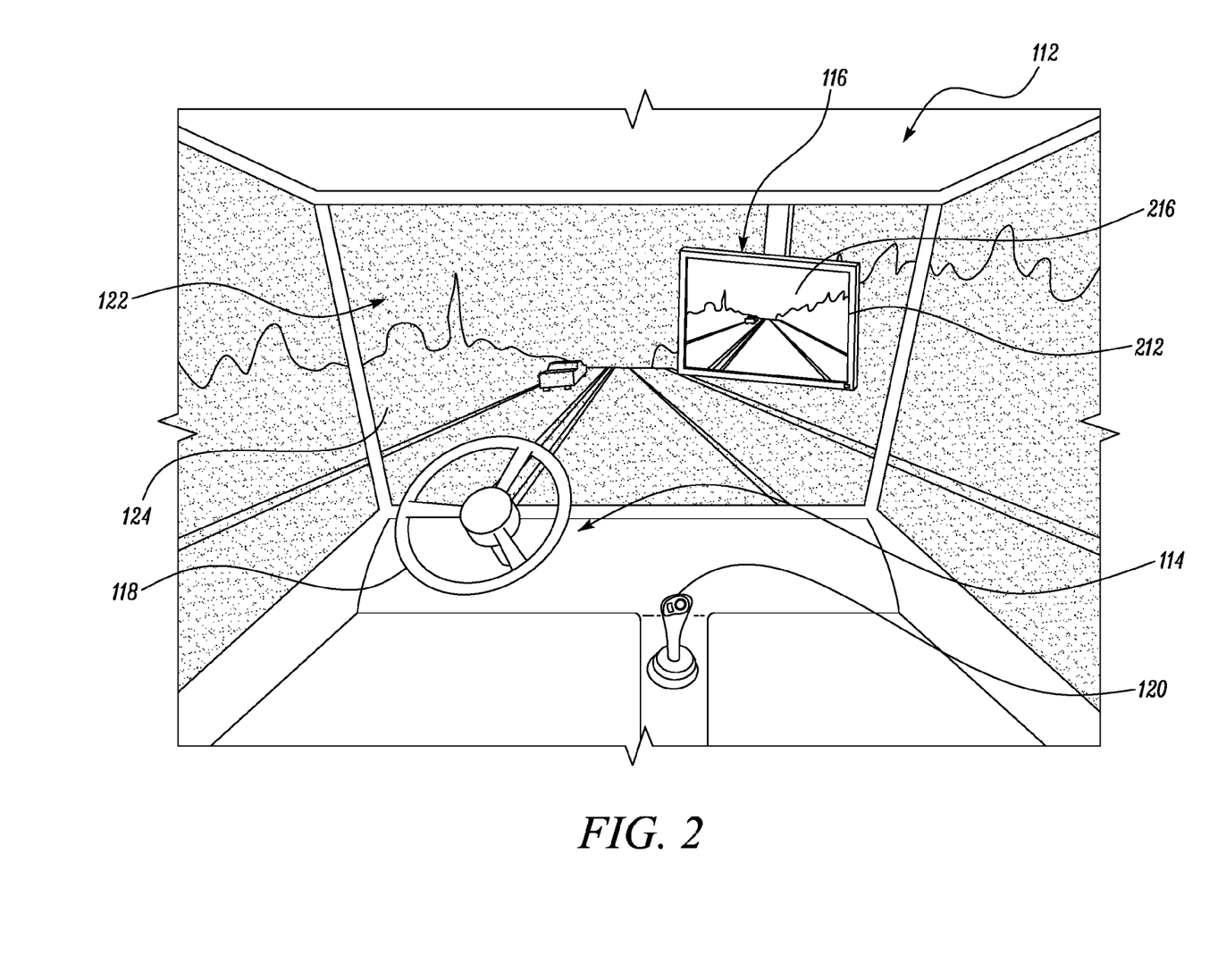
FIG. 2 illustrates an operator cabin of the work machine including a display unit displaying a de-hazed view of the hazy environment, in accordance with an embodiment of the present disclosure.

The machine 100 includes an operator station 112 supported over the body 104 at the front end 104a. The operator station 112 may facilitate stationing of one or more operators therein, enabling operator control over one or more functions of the machine 100. For example, the operator station 112 may house one or more operator interfaces, such as one or more input devices 114 and output devices 116 as shown in FIG. 2, that facilitate the operator in operating the machine 100. For example, the one or more input devices 114 may include, but not limited to, a steering wheel 118, a joystick 120, switches (not shown), and the like. The one or more output devices 116 may include, but not limited to, visual display units, audio units, or the like.

The machine 100 is designed and built to operate in all weather conditions. For instance, as can be seen in FIG. 1 and FIG. 2, the work environment 102 of the machine 100 is a hazy environment 122. In general, the term "hazy environment" corresponds to an environment which is characterized by the presence of at least one of smog, fog, drizzle, smoke, dust, or other airborne particulate matter, that cause low visibility for the operator. Therefore, when operating in inclement weather conditions, such as the hazy environment 122, the operator may be unable to clearly view the nearby surroundings through a windshield 124 of the machine 100.

In an embodiment of the present disclosure, the machine 100 includes a system 200 for providing clear view of the hazy environment 122 on the output device 116 positioned inside the operator station 112. The system 200 is configured to capture hazy videos/images of the hazy environment 122 surrounding the machine 100 and display corresponding de-hazed videos/images 216 on the output device 116 (see FIG. 2) for the operator of the machine 100. The detailed working of the system 200 will now be described with reference to FIGS. 3 through 5 in the following description.

Figure 3:
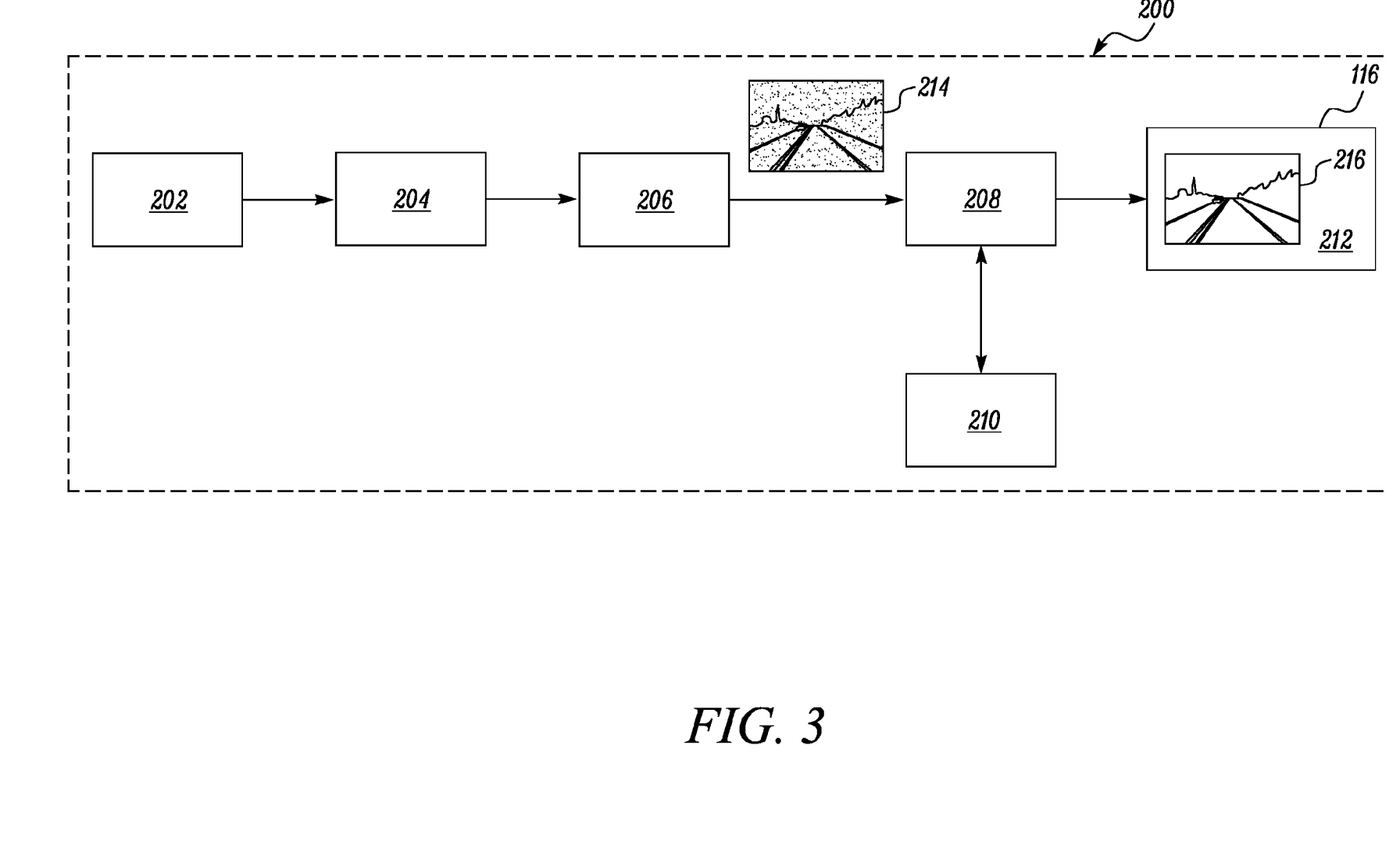
FIG. 3 illustrates an exemplary system for removing haziness in a digital image captured from the image capturing device, in accordance with an embodiment of the present disclosure.

Referring to FIG. 3, the system 200 includes an image capturing device 202, an encoder 204, a decoder 206, a processing unit 208, a memory unit 210, and a display unit 212, in accordance with the embodiments of the present disclosure. For example, the various components of the system 200 are communicatively coupled to one another, via suitable communication links, to send and receive data, information, images, videos etc., for processing according to the embodiments of the present disclosure. The communication links may be implemented through wired or wireless connections and may be a part of a secured network, such as a local area network (LAN) and/or a combination of networks, such as LANs, WANs, MANs and/or the Internet.

In one example, the image capturing device 202 is mounted at the front end 104a of the machine 100 (as shown in FIG. 1). In one example, the image capturing device 202 is configured to capture a video feed (or an image) of the work environment 102 of the machine 100 in its travel direction (e.g., a region substantially ahead of the machine 100, as visible through the windshield 124). For instance, the image capturing device 202 may capture a video feed (or image) of the hazy environment 122 surrounding the machine 100 (as shown in FIG. 2). The video feed (or image) of the hazy environment 122, as captured by the image capturing device 202, includes at least some haze effect content.

In an example, the image capturing device 202 is an Internet Protocol camera. In some other examples, the image capturing device 202 may be realized by any image capturing device such as a webcam, a digital camera, a smart phone, and a driving recorder, etc. In an exemplary embodiment, the system 200 includes only one image capturing device 202 mounted at the front end 104a of the machine 100. However, it may be contemplated that in various other embodiments, the system 200 may include multiple such image capturing devices mounted at various positions on the machine 100.

The encoder 204 is configured to receive the captured video feed/images from the image capturing device 202 and compress each video frame of the received video feed as Joint Pictures Expert Group (JPEG) images using a Motion-JPEG compression format. The resultant encoded image format is hereinafter referred to as the MJPEG image format. Video encoding by using the JPEG compression algorithms is well known in multimedia, and hence, is not described further herein for the sake of brevity of the present disclosure. It may be contemplated that MJPEG compression technique is merely exemplary and that in some other embodiments, the encoder 204 may encode the video feed according to other known moving picture compression standards, such as MPEG-2, MPE-4, and H.264, without deviating from the scope of the claimed subject matter. In various embodiments of the present disclosure, the encoder 204 is implemented as being integrally associated with the image capturing device 202. In alternative embodiments, the encoder 204 may be external to the image capturing device 202, without deviating from the scope of the claimed subject matter.

Further, the encoder 204 transmits the resultant MJPEG images to the decoder 206. In an embodiment of the present disclosure, the decoder 206 is configured to decode the received MJPEG image format into a YUV image format for further processing. In an example, the decoder 206 is implemented as being integrally associated with the display unit 212. In alternative implementations, the decoder 206 may be externally implemented without deviating from the scope of the present disclosure. Decoders for converting MJPEG images to YUV image format are well known in the art, and hence the detailed description of such decoders is omitted from the description for the sake of brevity.

In an embodiment, the resultant YUV image format is provided as an input digital image 214 on which the de-hazing processing is performed, in accordance with the embodiments of the present disclosure. For example, the decoder 206 transmits the generated input digital image 214 to the processing unit 208, for further image de-hazing processing. The processing unit 208 may be implemented using one or more controller technologies, such as Application Specific Integrated Circuit (ASIC), Reduced Instruction Set Computing (RISC) technology, Complex Instruction Set Computing (CISC) technology, etc. In an embodiment of the present disclosure, the processing unit 208 is a dedicated or fixed function image signal processor (ISP) such as low power Graphics Processing Unit (GPU) that processes information based on operational or programming instructions. For example, the processing unit 208 is configured to execute the instructions stored in the memory unit 210 to perform the predetermined operations. It may be contemplated that the low power GPU may be any GPU that possesses low graphical processing capabilities, such as a smaller number of GPU cores. In alternative embodiments, the processing unit 208 may be any other type of processing unit, such as Digital Signal Processors (DSPs), state machines, logic circuitry, etc.

The memory unit 210 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the system 200 has one or more of its functions performed by the processing unit 208, such as the low power GPU, the memory unit 210 containing the corresponding operational instructions can be embedded within such low power GPU.

The processing unit 208 is configured to receive the input digital image 214, in YUV image format, from the decoder 206 and process the received input digital image 214 to output a de-hazed output image 216 on the display unit 212. For example, the display unit 212 may be a computer console, a cab-mounted monitor, a head mountable display spectacle, etc. The detailed processing of the hazy input digital image 214 by the processing unit 208 to obtain the de-hazed output image 216 will now be described in detail in the following description.

Figure 4:
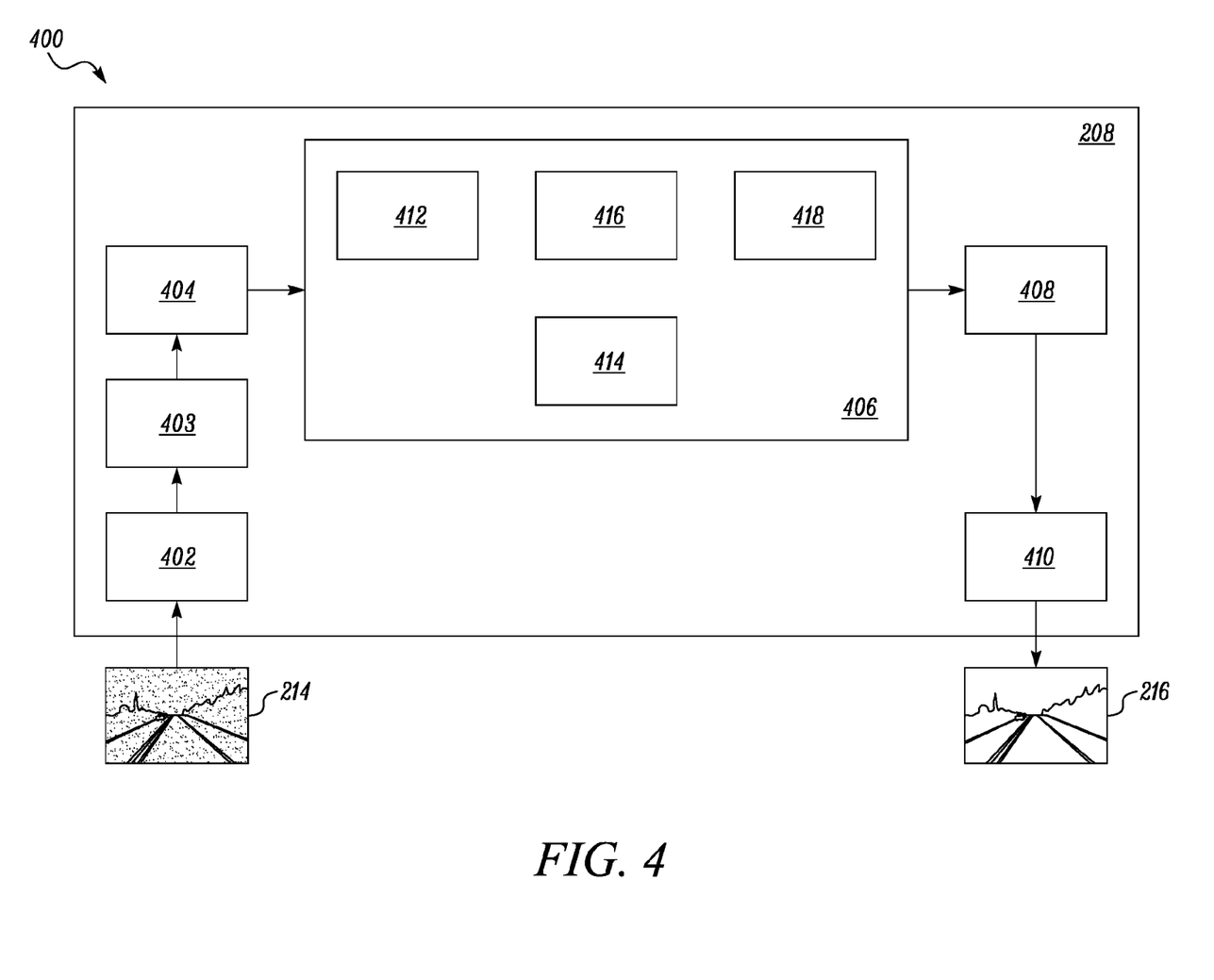
FIG. 4 illustrates an exemplary block diagram of a processing unit of the system discussed in FIG. 3, in accordance with an embodiment of the present disclosure.

FIG. 4 illustrates a block diagram 400 of the processing unit 208, in accordance with various embodiment of the present disclosure. In an embodiment of the present disclosure, the processing unit 208 includes an image receiving module 402, an image format conversion module 403, a downscaling module 404, a de-hazing module 406, an image enhancing module 408, and an image output module 410. Further, the de-hazing module 406 includes a dark channel prior module 412, an atmospheric light estimation module 414, a transmission map estimation module 416, and a refined transmission map estimation module 418. These various modules of the processing unit 208 are configured to communicate with one another via one or more communication links known in art.

According to some embodiments, the modules of the processing unit 208 may include logic embodied as hardware, software, firmware, or a combination thereof. For example, the modules of the processing unit 208 may be stored in the form of computer readable instructions on any type of non-transitory computer-readable medium, such as a memory device (e.g., random access, flash memory, and the like), an optical medium (e.g., a CD, DVD, BluRay®, and the like), firmware (e.g., an EPROM), or any other storage medium. The modules of the processing unit 208 may also be embodied as hardware modules and may be comprised of connected logic units, such as gates and flip-flops, and/or may be comprised of programmable units, such as programmable gate arrays or processors, for example.

The image receiving module 402 is configured to receive at least one input digital image, such as the input digital image 214, from the image capturing device 202. The input digital image 214 includes at least some haze effect content corresponding to the hazy environment 122 in which the machine 100 operates. In an exemplary embodiment and as explained above, the image receiving module 402 is configured to receive the raw YUV image format as the input digital image 214 from the decoder 206. Once the input digital image 214 is received, the image format conversion module 403 converts the input digital image 214, which is in YUV image format, into RGB image format for further processing.

Once the input digital image 214 is converted into RGB image format by the image format conversion module 403, the input digital image 214 is downscaled by the downscaling module 404 to obtain a corresponding low-resolution image. The term "low resolution" as used herein is intended to include any version of a given input digital image which has a reduced pixel size than the actual unscaled input digital image 214 received by the image receiving module 402. In an exemplary embodiment, the input digital image 214, which is of size 640 pixels wide and 360 pixels height, is downscaled to a low-resolution of 320 pixels wide and 180 pixels height. The downscaling of the input digital image 214 is performed to reduce the computational load and cost, and raise the efficiency of the image de-hazing processing done by the system 200.

The de-hazing module 406 is configured to perform image de-hazing processing on the low-resolution image. For example, the de-hazing module 406 uses the following model to obtain the intensity value of a pixel of the dehazed image:

$$I(x)=J(x)t(x)+A(1-t(x)) \quad (1)$$

wherein,
- 'I' represents the intensity value of any one of the R, G, B channels of a pixel in the hazy image;
- 'x' represents a pixel or a local patch (a cluster of pixels) of the low-resolution image having some haze content;
- "A" represents an atmospheric light value of the hazy image;
- t(x) represents a transmission ratio for the pixel "x" in the hazy low-resolution image and describes a portion of un-scattered light that reaches the image capturing device 202. In an exemplary embodiment of the present disclosure, the transmission t(x) is typically the transmission of air. However, the transmission t(x) can be the transmission of water or some other at least partially transparent media; and
- "J" represents the intensity value of the corresponding one of the R, G, B channels of the pixel in the de-hazed image;

Thus, in order to obtain the value of J(x), the values of t(x) and A are to be obtained, as the value of I(x) is already known from the received input digital image 214. The following description explains how the de-hazing module 406 obtains the values of A and t(x).

In an embodiment of the present disclosure, the de-hazing module 406 is configured to determine a minimum intensity dark channel for each local patch of the low-resolution image and obtain a dark channel image corresponding to the low-resolution image. For example, the dark channel prior module 412 of the de-hazing module 406, is configured to receive the low-resolution image and obtain the dark channel image corresponding to the low-resolution image based on the dark-channel prior model. For example, the dark channel prior module 412 determines the color channel (out of Red, Green, and Blue color channels) of minimum intensity (or near zero intensity) for each local patch (or a pixel) of the low-resolution image. The dark channel prior module 412 mathematically determines this minimum intensity or dark channel intensity $J^{dark}$ of the local patches based on the following equation:

$$J^{dark}(x) = \min_{c \in \{r,g,b\}} \left( \min_{y \in \Omega(x)} (J^c(y)) \right) \quad (2)$$

wherein, $J^C$ is the intensity of any one of the R, G, B channel of the scene irradiance J(x) corresponding to the color channel index c,
- $\Omega(x)$ is a local patch (or a pixel) at the location 'x' in the low-resolution image; and 'y' is all inputted pixels in the local patch $\Omega(x)$. Similarly, the dark channel prior module 412 determines the minimum intensity dark channels for the remaining local patches of the low-resolution image to obtain the dark channel image of the entire low-resolution image, which may be then stored and further processed.

Further, the de-hazing module 406 utilizes the atmospheric light estimation module 414 to determine the atmospheric light value 'A' associated with the low-resolution image. For example, the atmospheric light estimation module 414 identifies at least a portion of brightest pixels in the dark channel image of the low-resolution image. In an embodiment, the atmospheric light estimation module 414 identifies the top 10% brightest pixels in the dark channel image. Further, the atmospheric light estimation module 414 compares each of the identified pixels (e.g. top 10% brightest pixels) with corresponding pixels in the actual received input digital image 214 to identify the pixel(s) with highest intensity in the input digital image 214. The identified pixel(s) are then selected as atmospheric light, and accordingly, the atmospheric light value A is identified as the intensity of the identified pixel(s).

In an embodiment of the present disclosure, the de-hazing module 406 utilizes the transmission map estimation module 416 to determine a transmission map of the low-resolution image based on the determined dark channel image. For example, the transmission map estimation module 416 selects a constant value for the atmospheric light A to determine the transmission map. In an embodiment, the transmission map estimation module 416 may receive the atmospheric light value A from the atmospheric light estimation module 414. In some other embodiments, the transmission map estimation module 416 receives the atmospheric light value A as a constant from an associated light meter, a stored look-up table based on the time-of-day, a stored look-up table based on location, etc. or a combinations of these techniques. Further, the transmission map estimation module 416 considers the transmission of each local patch $\Omega(x)$ as a constant, and calculates the transmission by using the equation as follows:

$$t^c = 1 - \omega \min_{y \in \{r,g,b\}} \left( \min_{y \in \Omega(x)} \frac{I^C(y)}{A^C} \right) \quad (3)$$

wherein, ω is a correction coefficient which lies between 0 and 1 and represents a part of haze to be retained (to make the de-hazed output image 216 look more natural). In some embodiments, ω may be any value ranging between 0.85 and 0.95. In addition, in some other embodiments, ω may also be adjusted based on actual need, and is not intended to limit the scope of the claimed subject matter. Further, the transmission map estimation module 416 sets a lower threshold value '$t_0$' of the transmission, so as to avoid noise resulted from over reduction.

In an embodiment of the present disclosure, the determined transmission map is further refined, via refined transmission map estimation module 418, to eliminate (or minimize) block effects as observed in the determined transmission map of the low-resolution image. In one example, the refined transmission map estimation module 418 is configured to apply a bilateral filtering technique on the determined transmission map to obtain a refined transmission map of the low-resolution image with minimal block effects. By utilizing the bilateral filtering technique, the refined transmission map estimation module 418 replaces the intensity of each pixel associated with the low-resolution image with a weighted average of intensity values of the neighboring pixels to obtain the refined transmission map of the low resolution image, wherein the weighted average is based on a Gaussian distribution. The bilateral filtering technique is also well known in the art and thus is not described in greater detail for the sake of brevity. As the bilateral filtering technique is a simple edge-preserving technique and is relatively fast as compared to other edge-preserving techniques, the computational power requirement for refining the transmission map is reduced and the overall efficiency of the system 200 is increased.

Furthermore, the de-hazing module 406 applies the determined transmission map (or the refined transmission map) and the atmospheric light value associated with the low-resolution image to the input digital image 214 to generate the de-hazed output image 216. For example, the de-hazing module 406 is configured to scale the determined transmission map (or the refined transmission map) to the corresponding magnitude of the input digital image 214 to obtain a scaled transmission map (or refined transmission map). In an embodiment, the de-hazing module 406 scales the determined transmission map (or the refined transmission map) based on nearest neighbor interpolation techniques. The de-hazing module 406 utilizes the scaled transmission map (or refined transmission map) and the determined atmospheric light value to recover the actual scene irradiance J(x) by using the following equation:

$$J(x) = \frac{I(x) - A}{\max(t(x), t_0)} + A \quad (4)$$

wherein, $t_0$ is the lower threshold value of the transmission to avoid noise resulted from over reduction, and which lies between 0 and 1. For example, to may be 0.1, 0.2, or 0.3.

In an embodiment of the present disclosure, the image enhancing module 408 is configured to enhance the brightness and contrast characteristics of the generated de-hazed output image 216 by using image enhancing techniques. In one example, the image enhancing module 408 adjusts the brightness of the de-hazed output image 216 by using gamma correction technique. Further, in an exemplary implementation, the image enhancing module 408 adjusts the contrast characteristics of the de-hazed output image 216 by using the histogram equalization technique. Such image enhancing techniques, including the gamma correction technique and the histogram equalization techniques are well known and hence not described in detail for the sake of brevity. It may be contemplated by a person skilled in the art that the gamma correction and histogram equalization techniques are merely exemplary and that any other known technique for enhancing the brightness and contrast characteristics of the de-hazed output image may be implemented without deviating from the scope of the claimed subject matter.

Once the brightness and contrast characteristics are enhanced, the image output module 410 outputs the de-hazed output image 216 (such as the enhanced de-hazed output image) for display via display unit 212. In an embodiment, the image output module 410 continuously outputs the de-hazed output images in series as a de-hazed video to the display unit 212. It may be contemplated by a person skilled in the art that the de-hazed output images, the intermediate dark channel image and the transmission maps, may additionally be stored in the memory unit 210.

As explained previously, since all the processing to obtain the atmospheric light value and the transmission maps is done on the low-resolution image instead of the high-resolution image, the required processing times and the computation power is significantly reduced, thereby making it all implementable on the low power GPU.

INDUSTRIAL APPLICABILITY

When the machine 100 operates in the hazy environment 122, it is difficult for the operator of the machine 100 to clearly see the nearby surroundings. To address this issue, an image capturing device is installed at the machine to capture video feed of the nearby surroundings and a display unit is typically installed within the operator station to receive the video feed, from the image capturing device, and display the same for the operator to see. However, since the machine 100 operates in the hazy environment 122, the video feed captured by the image capturing device 202 positioned on the machine 100 is also a hazy video, which would not provide a clear display for the operator. In order to de-haze the video feeds captured by the image capturing device 202, the system 200 is provided. The system 200, according to the embodiments of the present disclosure, performs de-hazing processing on the hazy video feed captured by the image capturing device 202 to display a clear and a haze free video on the display unit 212, in real time, for facilitating easy operation of the machine 100 in such hazy work environments 122. Further, the system 200 converts the high-resolution image/video captured by the image capturing device 202 to a low-resolution image for performing the various de-hazing processing steps. Using low-resolution image instead of high-resolution image, for image processing, significantly reduces the processing time and power, which makes the processing possible on a low-end GPU. The implementation of the system 200 using the low-end GPU makes it very cost efficient too. For example, the processing time required by the system 200 for de-hazing a single image is reduced to 60 milliseconds per image. Thus, the de-hazed images/videos are provided on the display unit 212 in real-time.

Figure 5:
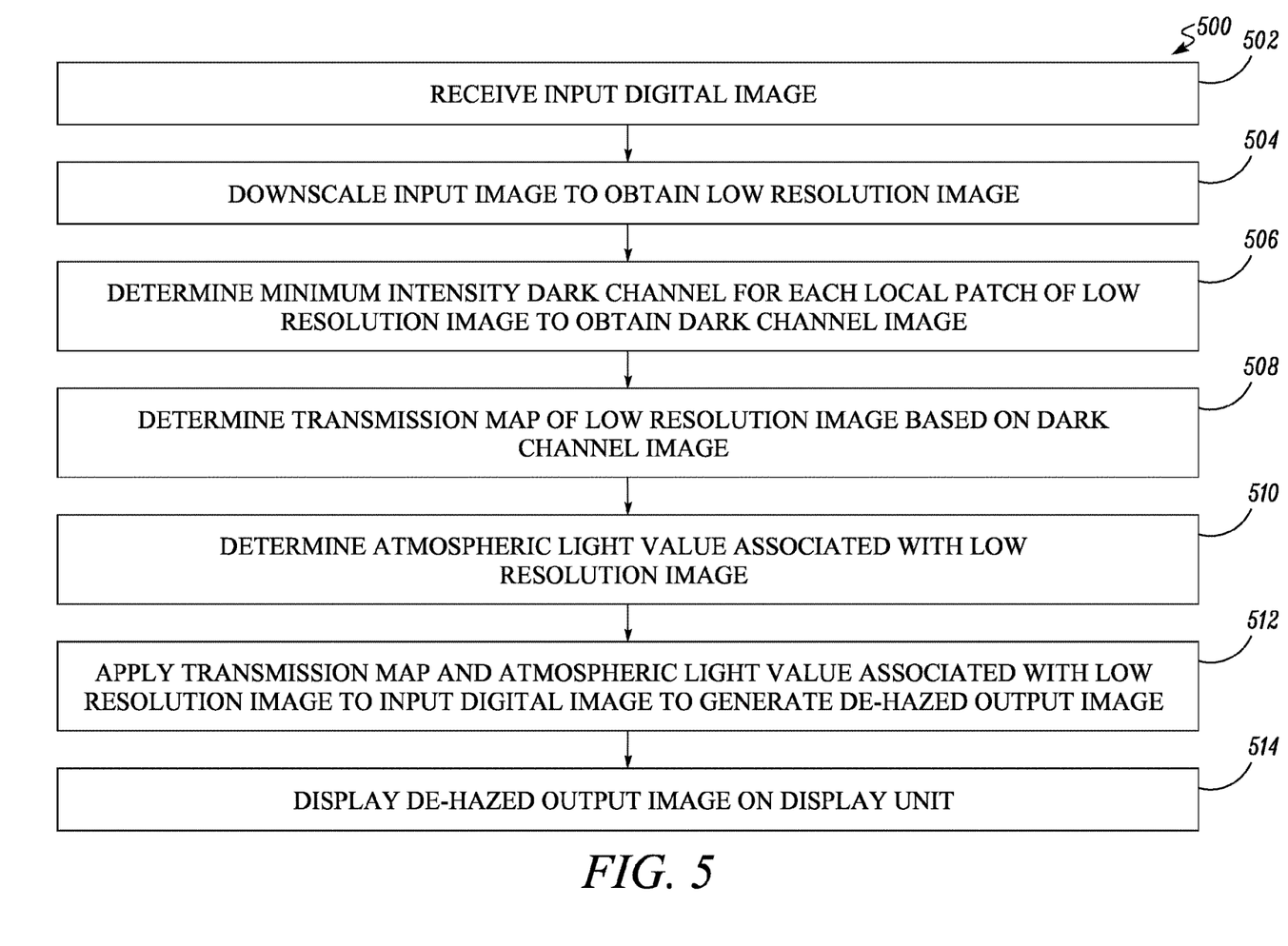
FIG. 5 illustrates an exemplary method for removing haziness in the digital image, in accordance with an embodiment of the present disclosure.
Figure 6:
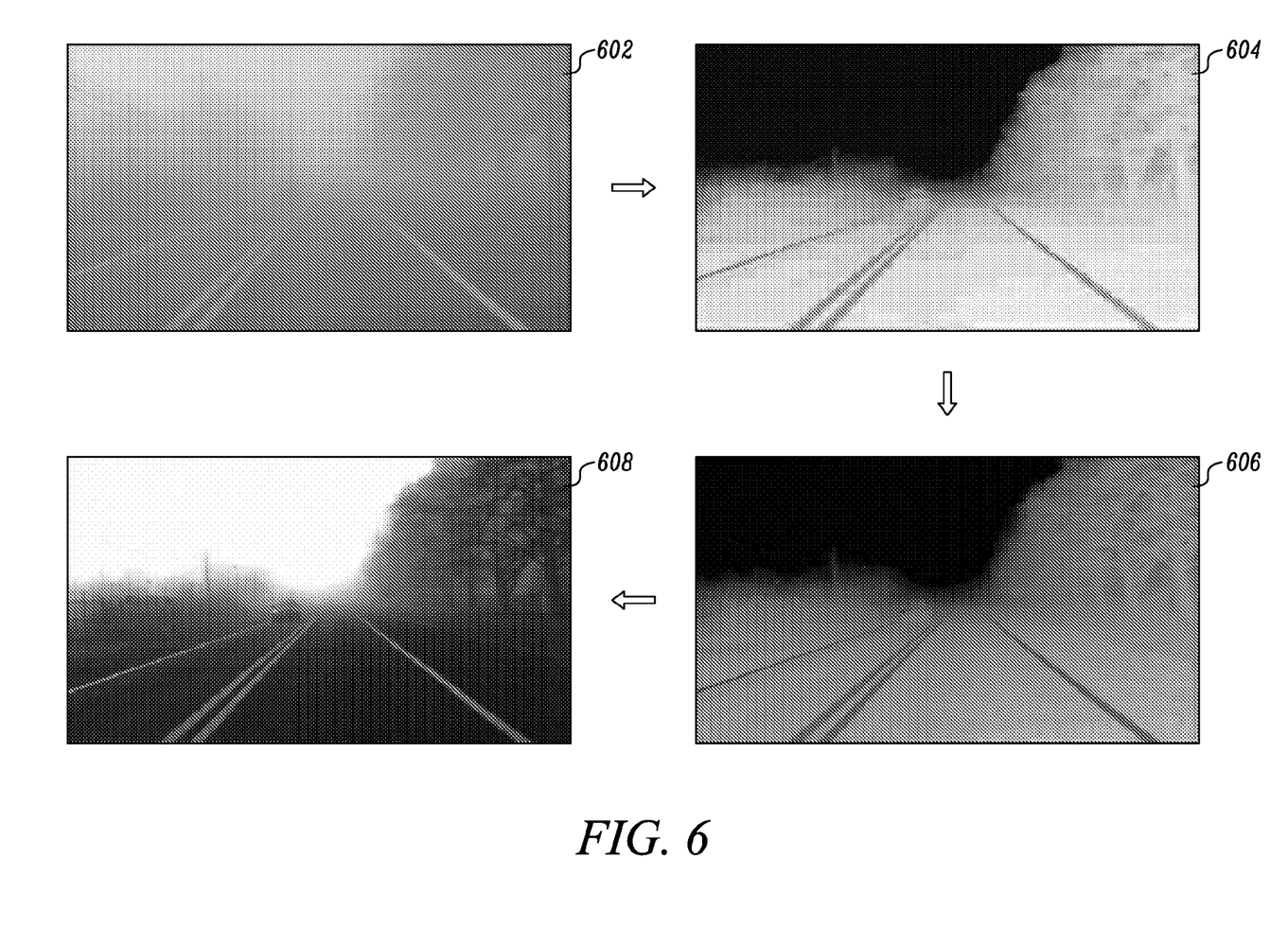
FIGS. 6 and 7 illustrate input digital images, transmission maps, refined transmission maps, and de-hazed output images of the hazy environment, in accordance with an embodiment of the present disclosure.
Figure 7:
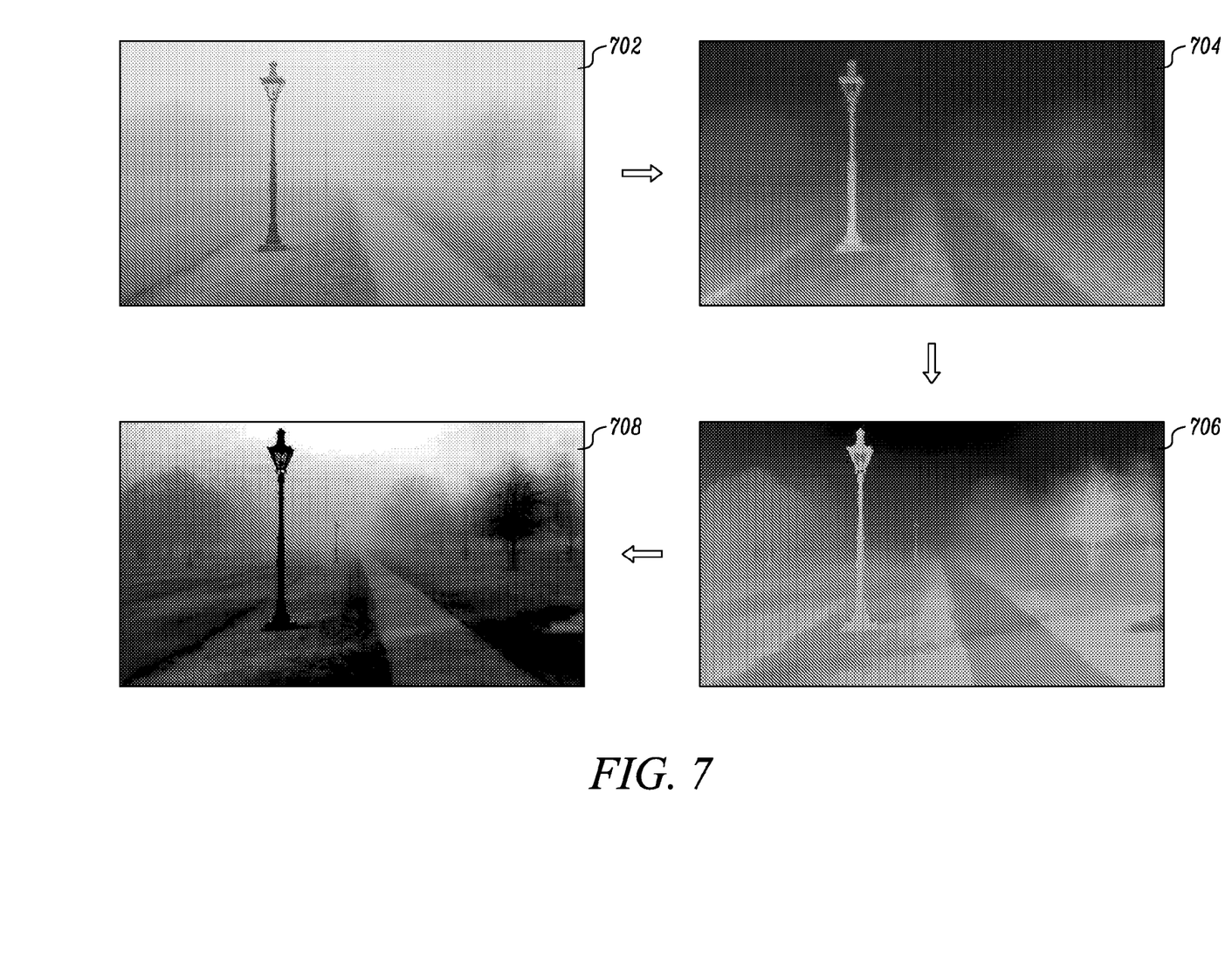

Referring to FIGS. 5 through 7, an exemplary method 500 for removing haziness in the input digital image 214 is discussed. Initially, at step 502, the input digital image 214 is received (see reference 602 in FIG. 6 and reference 702 in FIG. 7). In an embodiment, the image receiving module 402 of the processing unit 208 is configured to receive the input digital image 214 from the image capturing device 202. For example, as the machine 100 travels along a roadway, in the hazy environment 122, the image capturing device 202, mounted on the machine 100, continuously captures the video feed of the hazy environment 122 surrounding the machine 100. The captured video feed is first encoded, such as by the encoder 204, into the compressed motion-JPEG (MJPEG) image format. The compressed MJPEG image format is then decoded, such as by the decoder 206, to obtain the input digital image 214 in YUV image format, which is then converted into RGB image format by the processing unit 208 for further processing. For example, the image format conversion module 403 converts the input digital image 214 from the YUV image format to RGB image format.

Further, at step 504, the input digital image 214 is downscaled to obtain a corresponding low-resolution image. For example, the downscaling module 404 of the processing unit 208 is configured to downscale the received input digital image 214. In an embodiment, the input digital image 214 is downscaled to a low-resolution of 320 pixels wide and 180 pixels high image.

Once the low-resolution image is generated, the method proceeds to step 506, wherein a dark channel image corresponding to the low-resolution image is obtained by determining minimum intensity dark channel for each local patch of the low-resolution image. For example, the dark channel prior module 412 within the de-hazing module 406 utilizes a dark-channel prior model (represented by equation 2) to obtain the minimum intensity dark channel for each pixel or local patch, thereby determining the dark channel image corresponding to the entire low-resolution image.

Once the dark channel image is obtained, the method proceeds to step 508 where the transmission map of the low-resolution image is determined based on the dark channel image obtained at step 506 (see reference 604 in FIG. 6 reference 704 in FIG. 7). For example, the transmission map estimation module 416 of the de-hazing module 406 is configured to determine the transmission map (represented by equation 3) corresponding to the low-resolution image based on the determined dark channel image. In some embodiments, the transmission map is further refined to eliminate (or minimize) block effects as observed in the determined transmission map of the low-resolution image. For example, the refined transmission map estimation module 418 is configured to apply a bilateral filtering technique on the transmission map to obtain the refined transmission map of the low-resolution image (see reference 606 in FIG. 6 and reference 706 in FIG. 7).

Further, at step 510, the atmospheric light value associated with the low-resolution image is determined. For example, the atmospheric light estimation module 414 of the de-hazing module 406 is configured to determine the atmospheric light value associated with the low-resolution image. In an embodiment, top 10% brightest pixels in the dark channel image are identified and compared with corresponding pixels in the actual received input digital image 214 to identify the pixel(s) with highest intensity in the input digital image 214. The identified pixel(s) are then selected as atmospheric light, and accordingly, the atmospheric light value A is identified as the intensity of the identified pixel(s).

Once the transmission map t(x) and the atmospheric light value A are determined based on the low-resolution image, the method proceeds to step 512. In an embodiment, the determined transmission map (and/or the refined transmission map) and the atmospheric light value associated with the low-resolution image are applied (using equation 4), via de-hazing module 406, to the input digital image 214 to generate the de-hazed output image 216 (see reference 608 in FIG. 6 and reference 708 in FIG. 7).

In some exemplary embodiments of the present disclosure, the generated de-hazed output image 216 may be further enhanced by enhancing the brightness and contrast characteristics of the generated de-hazed output image 216. For example, the image enhancing module 408 is configured to use techniques such as gamma correction and histogram equalization to enhance the brightness and contrast characteristics of the de-hazed output image 216. Once the de-hazed output image 216 is generated at step 512, the method proceeds to step 514 where the de-hazed output image 216 is finally displayed on the display unit 212 positioned inside the operator station of the machine 100.

With the applicability of the system 200 and method 500, the operator of the machine 100 gets a clearer de-hazed video output of the nearby surroundings in real time, while operating in hazy environments.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

The invention claimed is:

1. A method for removing haziness in a digital image, the method comprising:
   receiving, by a processing unit, an input digital image from an image capturing device, the input digital image depicting at least some haze content;
   downscaling, by the processing unit, the input digital image to obtain a low-resolution image, wherein the low-resolution image comprises pixels having intensity values associated with multiple color channels;
   determining, by the processing unit, a dark channel image corresponding to the low-resolution image by:
      identifying minimum intensity dark channels associated with respective local patches of the pixels of the low-resolution image, wherein:
         a minimum intensity dark channel associated with a particular local patch is identified as one color channel of the multiple color channels that is associated with lowest intensity values within the particular local patch; and
      generating the dark channel image using the minimum intensity dark channels associated with the respective local patches;
   determining, by the processing unit, an atmospheric light value associated with the low-resolution image;
   determining, by the processing unit, a transmission map of the low-resolution image by computing a transmission ratio for each of the respective local patches, based on:
      the minimum intensity dark channels associated with the respective local patches in the dark channel image, and
      the atmospheric light value;
   scaling, by the processing unit, the transmission map to a corresponding magnitude of the input digital image to generate a scaled transmission map;
   generating, by the processing unit, a de-hazed output image by applying the scaled transmission map and the atmospheric light value to the input digital image; and
   displaying, by the processing unit, the de-hazed output image on a display unit.

2. The method of claim 1, wherein receiving the input digital image further comprises:
   receiving, by an encoder associated with the image capturing device, a video feed captured by the image capturing device;
   encoding, by the encoder, the video feed into a compressed motion-JPEG image format; and
   decoding, by a decoder associated with the display unit, the compressed motion-JPEG image format to obtain the input digital image in a YUV image format.

3. The method of claim 1, wherein the low-resolution image has a resolution of 320 pixels wide and 180 pixels high.

4. The method of claim 1, wherein determining the transmission map further comprises refining, by the processing unit, the transmission map using a bilateral filtering technique.

5. The method of claim 1, wherein determining the atmospheric light value of the low-resolution image comprises:
   identifying, by the processing unit, a set of brightest pixels in the dark channel image;
   identifying, by the processing unit, a set of high intensity pixels of the input digital image that correspond to the set of brightest pixels in the dark channel image; and
   determining, by the processing unit, the atmospheric light value of the low-resolution image based on the intensity values of the set of high intensity pixels of the input digital image.

6. The method of claim 1 further comprising enhancing, by the processing unit, one or more of brightness or contrast characteristics of the de-hazed output image.

7. A system for removing haziness in a digital image, the system comprising:

an image capturing device associated with a mobile work machine;

a display unit associated with the mobile work machine;

a memory unit; and a processing unit communicatively coupled to the image capturing device, the display unit, and the memory unit, the processing unit being configured to:

receive an input digital image, from the image capturing device, depicting at least some haze content;

downscale the input digital image to obtain a low-resolution image, wherein the low-resolution image comprises pixels having intensity values associated with multiple color channels;

determine a dark channel image corresponding to the low-resolution image by:

identifying minimum intensity dark channels associated with respective local patches of the pixels of the low-resolution image, wherein:

a minimum intensity dark channel associated with a particular local patch is identified as one color channel of the multiple color channels that is associated with lowest intensity values within the particular local patch; and generating the dark channel image using the minimum intensity dark channels associated with the respective local patches;

determine an atmospheric light value associated with the low-resolution image;

determine a transmission map of the low-resolution image by computing a transmission ratio for each of the respective local patches, based on:

the minimum intensity dark channels associated with the respective local patches in the dark channel image, and the atmospheric light value;

scaling, by the processing unit, the transmission map to a corresponding magnitude of the input digital image to generate a scaled transmission map;

generating a de-hazed output image by applying the scaled transmission map and the atmospheric light value to the input digital image; and display the de-hazed output image on the display unit.

8. The system of claim 7, further comprising:

an encoder configured to receive a video feed captured by the image capturing device and encode the video feed into a compressed motion-JPEG image format; and a decoder configured to decode the compressed motion-JPEG image format to obtain the input digital image in a YUV image format.

9. The system of claim 7, wherein the low-resolution image has a resolution of 320 pixels wide and 180 pixels high.

10. The system of claim 7, wherein the processing unit is a low power graphics processing unit.

11. The system of claim 7, wherein the processing unit is further configured to refine the transmission map by using a bilateral filtering technique.

12. The system of claim 7, wherein the processing unit is configured to determine the atmospheric light value of the low-resolution image by:

identifying a set of brightest pixels in the dark channel image;

identifying a set of high intensity pixels of the input digital image that correspond to the set of brightest pixels in the dark channel image; and determining the atmospheric light value of the low-resolution image based on the intensity values of the set of high intensity pixels of the input digital image.

13. The system of claim 7, wherein the processing unit is further configured to enhance one or more of brightness or contrast characteristics of the de-hazed output image.

14. The method of claim 2, wherein:

receiving the input digital image further comprises converting, by the processing unit, the input digital image in the YUV image format into an RGB image format, and the multiple color channels comprise a red channel, a green channel, and a blue channel associated with the RGB image format.

15. The method of claim 1, wherein the atmospheric light value is determined based on at least one of:

a constant value provided by a light meter, or a look-up table based on at least one of a time of day or a location associated with the input digital image.

16. One or more non-transitory computer-readable media storing computer-executable instructions that, when executed by a processing unit, cause the processing unit to:

receive an input digital image depicting at least some haze content;

downscale the input digital image to obtain a low-resolution image, wherein the low-resolution image comprises pixels having intensity values associated with multiple color channels;

determine a dark channel image corresponding to the low-resolution image by:

identifying minimum intensity dark channels associated with respective local patches of the pixels of the low-resolution image, wherein:

a minimum intensity dark channel associated with a particular local patch is identified as one color channel of the multiple color channels that is associated with lowest intensity values within the particular local patch; and generating the dark channel image using the minimum intensity dark channels associated with the respective local patches;

determine an atmospheric light value associated with the low-resolution image;

determine a transmission map of the low-resolution image by computing a transmission ratio for each of the respective local patches, based on:

the minimum intensity dark channels associated with the respective local patches in the dark channel image, and the atmospheric light value;

generate a scaled transmission map by scaling the transmission map to a corresponding magnitude of the input digital image;

generate a de-hazed output image by applying the scaled transmission map and the atmospheric light value to the input digital image; and cause a display unit to display the de-hazed output image.

17. The one or more non-transitory computer-readable media of claim 16, wherein the multiple color channels comprise a red channel, a green channel, and a blue channel associated with a RGB image format.

18. The one or more non-transitory computer-readable media of claim 17, wherein the minimum intensity dark channels associated with the respective local patches are identified as one of the red channel, the green channel, or the blue channel that is associated with the lowest intensity values within the respective local patches.

19. The one or more non-transitory computer-readable media of claim 16, wherein determining the transmission map further comprises refining, by the processing unit, the transmission map using a bilateral filtering technique.

20. The one or more non-transitory computer-readable media of claim 16, wherein determining the atmospheric light value of the low-resolution image comprises:
  identifying a set of brightest pixels in the dark channel image;
  identifying a set of high intensity pixels of the input digital image that correspond to the set of brightest pixels in the dark channel image; and
  determining, by the processing unit, the atmospheric light value of the low-resolution image based on the intensity values of the set of high intensity pixels of the input digital image.

\* \* \* \* \*